Figure 1:
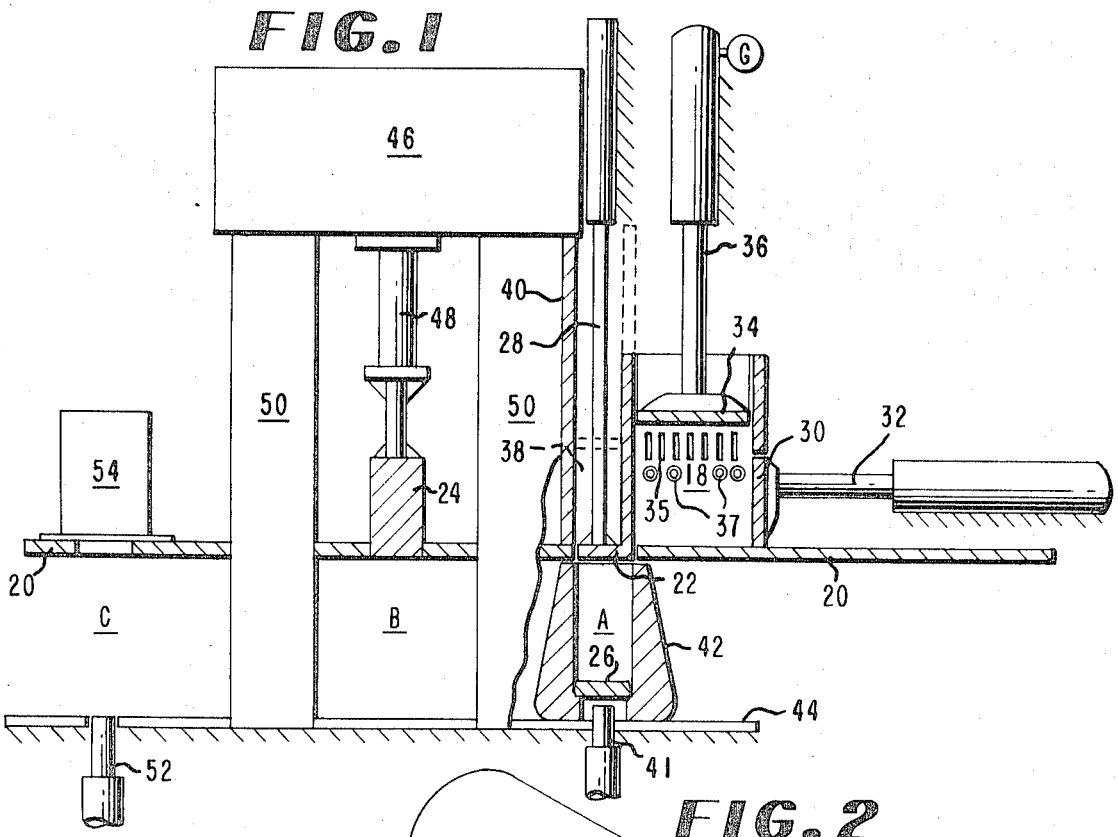
Figure 2:
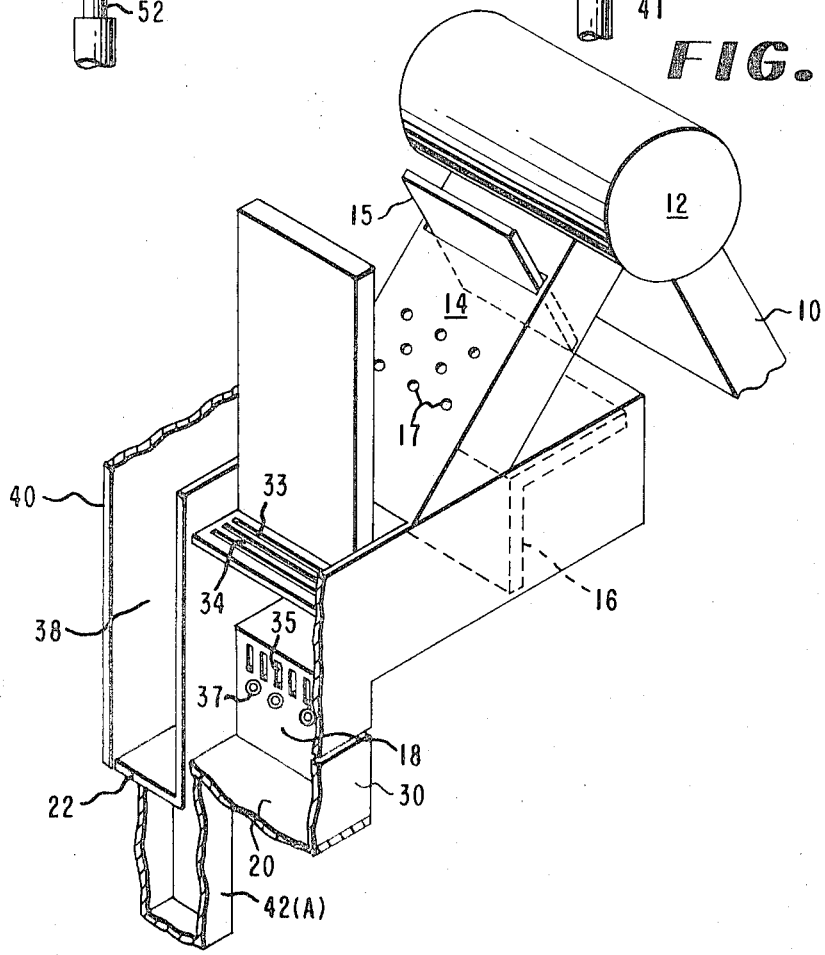

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 30, 1971

892 O.G. 1606

T892,027
BALING APPARATUS
Bernard Landoff Matthews, 2509 Kittiwake Drive, Brookemeade, Wilmington, Del. 19805
Filed Oct. 26, 1970, Ser. No. 83,726
Int. Cl. B30b *15/30*
U.S. Cl. 100—215
1 Sheet Drawing. 11 Pages Specification

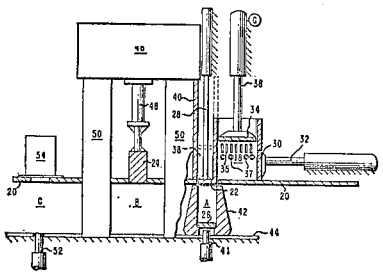

A baling apparatus with facilities for successive, bidirectional stages of compression. In the first stage, staple fibers are accumulated and tamped into a batt of low density. One wall of the accumulation chamber is a platen which transfers the tamped batt to an intermediate chamber, further compresses it in a second stage and then functions as a wall of the intermediate chamber. Next, the batt is ejected into a mold which travels on tracks into position for the third stage beneath a high compression platen. The platens move downwardly in the first and third stages and laterally in the second stage.

Nov. 30, 1971 B. L. MATTHEWS T892,027

BALING APPARATUS

Filed Oct. 26, 1970